(12) United States Patent
Harris et al.

(10) Patent No.: US 7,224,674 B2
(45) Date of Patent: May 29, 2007

(54) METHOD AND APPARATUS FOR WIRELESS DATA TRANSFER WITH REDUCED DELAY

(75) Inventors: John M. Harris, Chicago, IL (US); Sharon W. Tung, Arlington Heights, IL (US); Jay Jayapalan, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 940 days.

(21) Appl. No.: 10/108,405

(22) Filed: Mar. 28, 2002

(65) Prior Publication Data

US 2003/0185161 A1    Oct. 2, 2003

(51) Int. Cl.
*H04Q 7/00* (2006.01)
*H04Q 7/20* (2006.01)
*H04J 3/16* (2006.01)
*H04B 1/38* (2006.01)
*H04M 1/00* (2006.01)

(52) U.S. Cl. ............... 370/329; 370/437; 455/466; 455/458; 455/567

(58) Field of Classification Search ........... 370/329, 370/335, 342, 437; 455/70, 466
See application file for complete search history.

(56) References Cited

U.S. PATENT DOCUMENTS

| | | | |
|---|---|---|---|
| 5,678,192 A | 10/1997 | Paavonen et al. | |
| 5,797,103 A | 8/1998 | Duda | |
| 5,930,706 A * | 7/1999 | Raith | 455/422.1 |
| 6,094,423 A | 7/2000 | Alfano et al. | |
| 6,138,158 A | 10/2000 | Boyle et al. | |
| 6,249,681 B1 * | 6/2001 | Virtanen | 455/466 |
| 6,725,053 B2 * | 4/2004 | Rosen et al. | 455/518 |
| 6,952,426 B2 * | 10/2005 | Wu et al. | 370/441 |
| 6,980,818 B2 * | 12/2005 | Harris et al. | 455/466 |
| 7,031,291 B2 * | 4/2006 | Chen et al. | 370/342 |
| 2002/0055364 A1 * | 5/2002 | Wang et al. | 455/466 |
| 2002/0058522 A1 * | 5/2002 | Kim et al. | 455/466 |
| 2003/0035393 A1 * | 2/2003 | Sinnarajah et al. | 370/335 |
| 2003/0157945 A1 * | 8/2003 | Chen et al. | 455/458 |
| 2004/0190471 A1 * | 9/2004 | Bender et al. | 370/329 |

FOREIGN PATENT DOCUMENTS

WO    WO 01/30094 A1    1/2001

OTHER PUBLICATIONS cdmaA2000 Rev. A, Mar. 2000, Appendix B (Call flow examples), p. B-4.*

* cited by examiner

*Primary Examiner*—Wing Chan
*Assistant Examiner*—Warner Wong
(74) *Attorney, Agent, or Firm*—Jeffrey K. Jacobs

(57) ABSTRACT

To address the need for reducing wireless data transfer delay, an embodiment of this invention provides for a radio access network (RAN) (110) to transmit data, such as a data query, at the time of paging a dormant wireless unit (101). By transmitting the data at this time, wireless unit activity in response to the data can begin while the paging and traffic channel setup proceed. Thus, once established, the traffic channel will be idle for less time than under the present practice were data is not sent until the traffic channel setup is completed. Less idle traffic channel time is expected to improve channel utilization and contribute to lower packet data costs.

18 Claims, 2 Drawing Sheets

METHOD AND APPARATUS FOR WIRELESS DATA TRANSFER WITH REDUCED DELAY

CROSS-REFERENCE TO RELATED APPLICATION

This application is related to a co-pending application entitled "METHOD AND APPARATUS TO REDUCE WIRELESS DATA TRANSFER DELAY," filed on even date herewith, assigned to the assignee of the instant application, and hereby incorporated by reference.

FIELD OF THE INVENTION

The present invention relates generally to communication systems and, in particular, to wireless data transfer.

BACKGROUND OF THE INVENTION

In existing wireless communication systems, the "cost per bit" for packet data services can be relatively high. This is due in part to low channel utilization. Presently, when a dormant wireless user queries a packet network, the response time experienced by that user includes (1) the time it takes for the Wireless Network to establish the required wireless traffic channels, and (2) the time it takes the Data Network (Intranet or the Internet) to respond with the requested content. Wireless traffic channels need to be established because the user's mobile has gone dormant due to inactivity.

To improve the user's perceived packet data response time, system operators increase the inactivity timers in their systems to allow users to remain active longer. Since the mobile unit does not need to reestablish traffic channels while active, the user only experiences the delay caused by the Data Network and not the Wireless Network when querying. However, this improved response time comes at the expense of channel utilization. A traffic channel remains assigned to a particular mobile until its inactivity timer expires. Thus, with longer inactivity timers, channels will be held without being utilized for a longer period of time. This situation is contributing to the present higher "cost per bit" for packet data services.

Channel utilization in present systems is also less than optimal when the packet network queries the mobile unit for data. If the mobile is dormant, it needs to first be paged and then a traffic channel established. This is analogous to the wireless network delay referred to above. Similarly, receiving the query via the traffic channel and then responding with the requested data are analogous to the data network delay of above. However, instead of network delays, the mobile unit may have delays such as waiting for the user to enter information. Whatever the cause, the traffic channel is not being utilized during such delays, resulting in a reduced channel utilization. Therefore, a need exists for an apparatus and method to reduce wireless data transfer delay.

DESCRIPTION OF A PREFERRED EMBODIMENT

To address the need for reducing wireless data transfer delay, an embodiment of this invention provides for a radio access network (RAN) to transmit data, such as a data query, at the time of paging a dormant wireless unit. By transmitting the data at this time, wireless unit activity in response to the data can begin while the paging and traffic channel setup proceed. Thus, once established, the traffic channel will be idle for less time than under the present practice were data is not sent until the traffic channel setup is completed. Less idle traffic channel time is expected to improve channel utilization and contribute to lower packet data costs.

Figure 1:
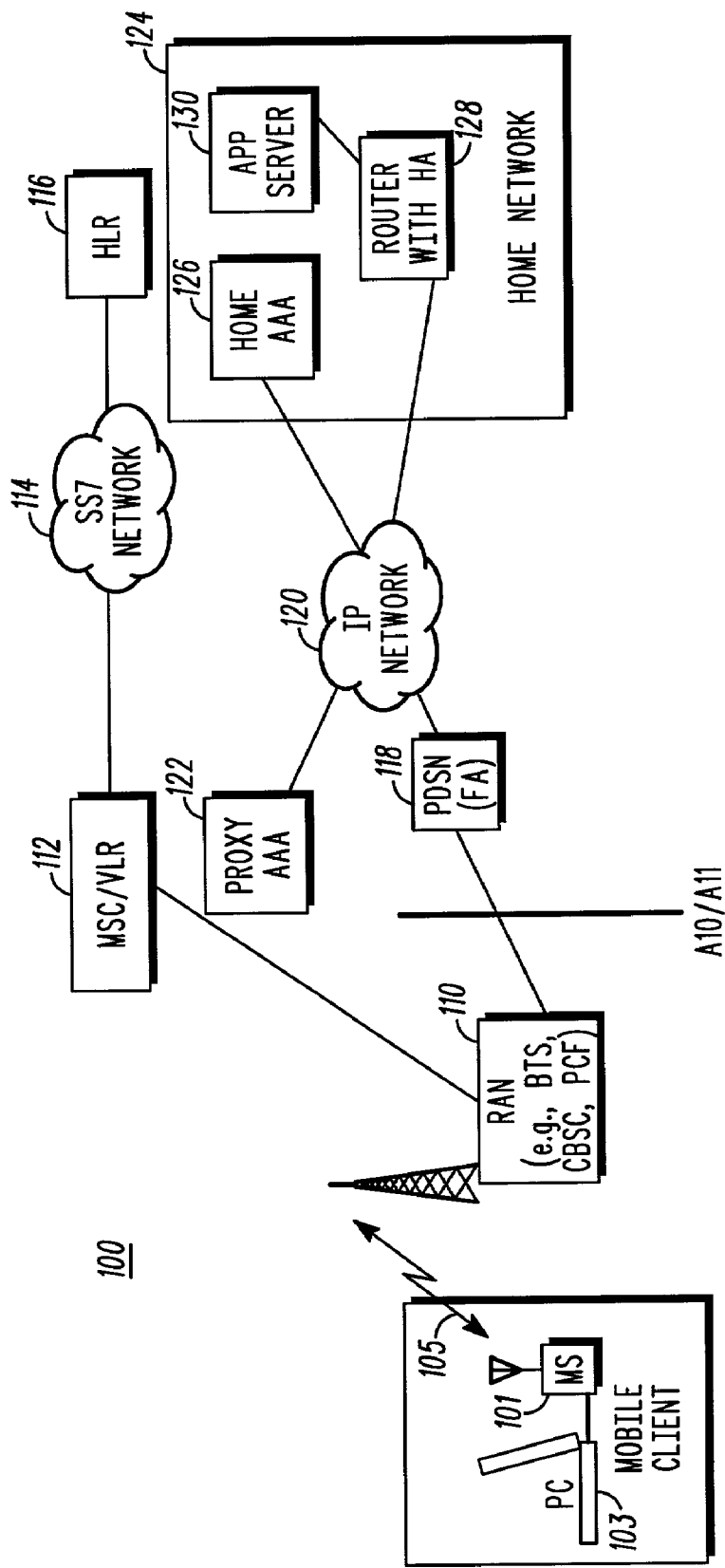
FIG. 1 is a block diagram depiction of a communication system in accordance with a first embodiment of the present invention.
Figure 2:
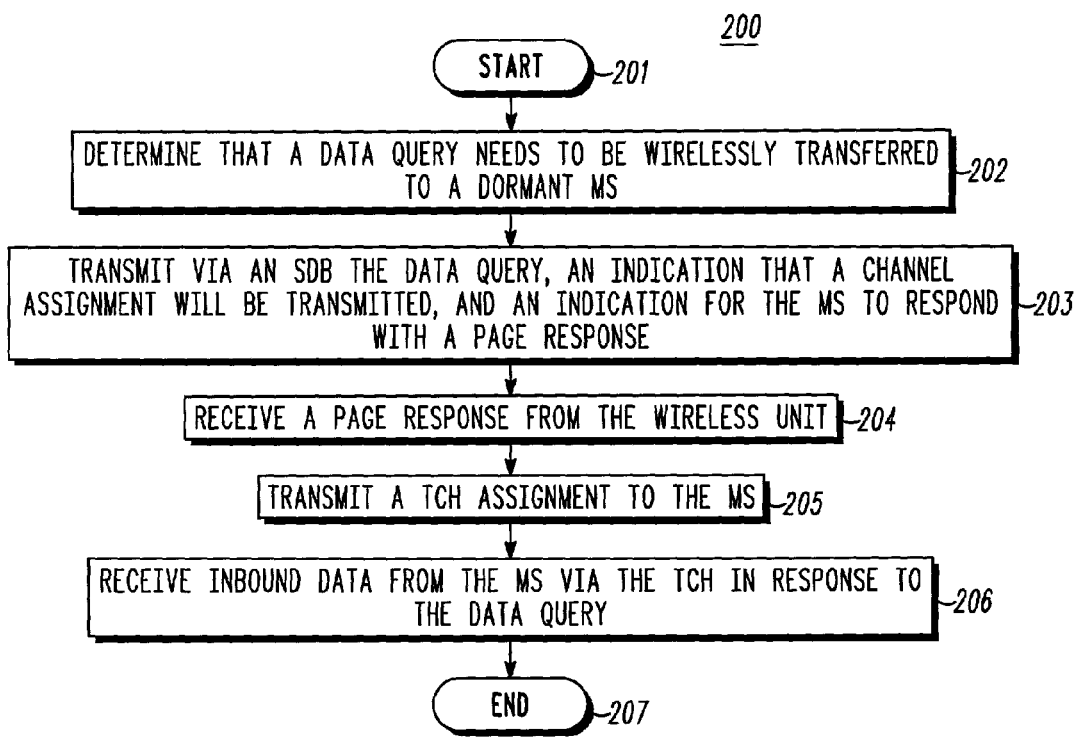
FIG. 2 is a logic flow diagram of steps executed by a radio access network in accordance with a first embodiment of the present invention.
Figure 3:
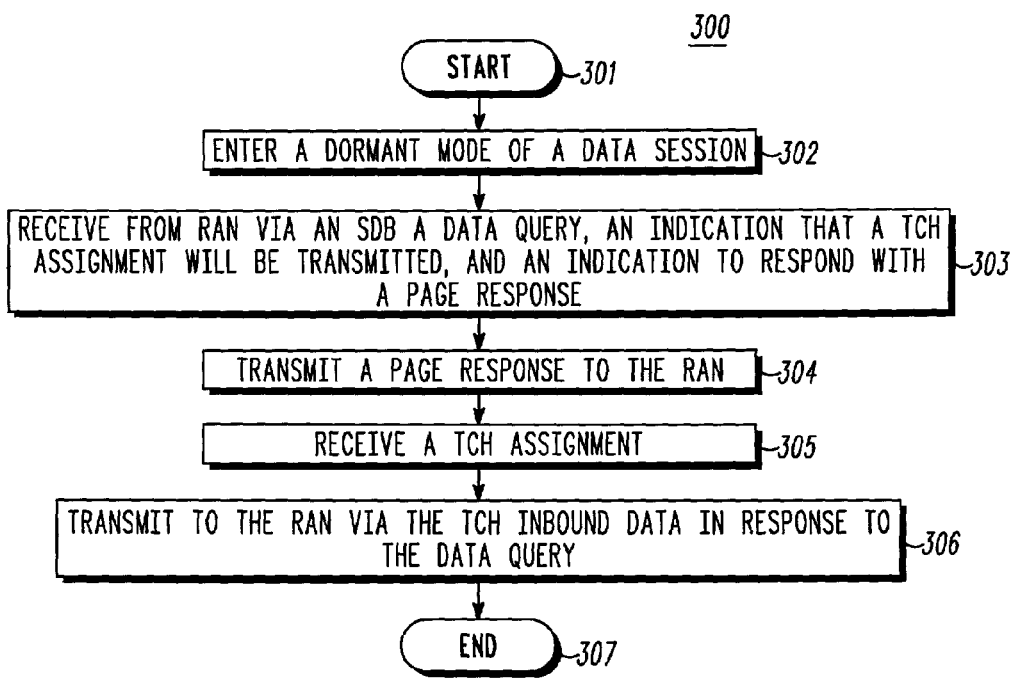
FIG. 3 is a logic flow diagram of steps executed by a wireless unit in accordance with a first embodiment of the present invention.

The present invention can be more fully understood with reference to FIGS. 1–3. FIG. 1 is a block diagram depiction of a communication system 100 in accordance with a first embodiment of the present invention. Communication system 100 is a well-known Code Division Multiple Access (CDMA) system, specifically a CDMA-1X system, which is based on the Telecommunications Industry Association/Electronic Industries Association (TIA/EIA) standard IS-2000 Release A (CDMA2000), suitably modified to implement the present invention. Alternative embodiments of the present invention may be implemented in communication systems that employ other technologies such as those based on the UMTS standards from 3GPP.

The first embodiment of the present invention includes radio access network (RAN) 110 and wireless units, such as mobile station (MS) 101, perhaps connected to personal computer 103. However, the present invention is not limited to wireless units that are mobile. For example, a wireless unit may comprise a desktop computer wirelessly connected to the radio access network.

Those skilled in the art will recognize that FIG. 1 does not depict all of the network equipment necessary for system 100 to operate but only those devices particularly relevant to the description of this first embodiment of the present invention. For example, RAN 110 comprises well-known entities such as a base transceiver station (BTS), a centralized base site controller (CBSC), and a packet control function (PCF). As shown in FIG. 1, system 100 further comprises well-known entities like mobile switching center/virtual location register (MSC/VLR) 112, Signaling System 7 (SS7) network 114, home location register (HLR) 116, packet data serving node (PDSN) 118, internet protocol (IP) network 120, proxy Authentication, Authorization and Accounting Server (AM) 122, and home network 124, which includes home AM 126, Home Agent (HA) router 128, and application server 130. Although PDSN 118 is shown separate from RAN 110 in the first embodiment, it is understood that a PDSN may also be included in the RAN network equipment. In the first embodiment, a known CDMA-1 X RAN is adapted using known telecommunications design and development techniques to implement the RAN aspect of the present invention. The result is RAN 110, which performs the method described with respect to FIG. 2. Those skilled in the art will recognize that the RAN aspect of the present invention may be implemented in and across various physical components of RAN 110.

RAN 110 communicates with MS 101 via CDMA-1X air interface resources 105. MS 101 comprises a processor (e.g., memory and processing devices), a receiver, a transmitter, a keypad, and a display. Transmitters, receivers, processors, keypads, and displays as used in CDMA MSs are all well known in the art. This common set of MS components is adapted using known telecommunications design and development techniques to implement the wireless unit aspect of the present invention. Thus modified, MS 101 performs the method described with respect to FIG. 3.

Operation of the first embodiment, in accordance with the present invention, occurs substantially as follows. The RAN network equipment of RAN 110 determines that outbound data needs to be wirelessly transferred to a wireless unit (e.g., MS 101), which is in a dormant mode of a data session. This outbound data may be data that RAN 110 has generated internally for MS 101 or data that is received from an external source such as a new mail notification from an email server or a stock update from a financial server. The outbound data may also be a request for information from MS 101, i.e., a data query. For example, a server in RAN 110 or connected to RAN 110 may need information stored in MS 101 or perhaps stored in PC 103 (a wireless server access), may need to upload telemetry data (e.g., utility usage, system performance, etc.), or may need information from the user of MS 101.

Under the CDMA2000 standard, the BTSs of RAN 110 would page the dormant MS 101 via a broadcast (i.e., a paging) channel. In the first embodiment of the present invention, the BTSs of RAN 110 transmit, via a broadcast channel, the outbound data and an indication that a channel assignment will be transmitted. Specifically, the outbound data and this indication are transmitted via a Short Data Burst (SDB) message. SDB messaging is provided under IS-707. In a second or alternate embodiment, Short Message Service (SMS) messaging may be used instead of SDB messaging.

In addition to transmitting the outbound data and an indication that a channel assignment will be transmitted, an indication for MS 101 to respond to the SDB with a page response (in place of the acknowledgment currently sent in response to SDBs) is also transmitted. Both or either of these indications may be explicitly indicated in the SDB or implicitly indicated (as understood in the context of the protocol) by the transmission this type of an SDB. Thus, in effect, the SDB serves as a page in addition to transporting the outbound data. In contrast, the BTSs of an alternative RAN may instead transmit an indication for the wireless unit to enter an un-slotted mode and monitor for a page. The alternative RAN would then transmit a page.

The receiver of MS 101 receives the SDB containing the outbound data. In response to the indication to reply with a page response, the processor of the dormant MS 101 instructs the transmitter of MS 101 to transmit a page response to RAN 110. In response to the indication that a channel assignment will be transmitted, MS 101 enters an unslotted mode in which it constantly monitors the paging channel for the expected channel assignment message. And with the outbound data, the processor of MS 101 determines what action is appropriate based on the type of data received. For example, data from "push" services like email or market updates may require notifying the user that an update is about to be received. Data that is a query for information may require prompting the user for the information, requesting the information from a connected device such as PC 103, or internally preparing to send the requested data.

Having received the page response, a BTS of RAN 110 transmits a channel assignment to MS 101 for a TCH. The receiver of MS 101 receives the channel assignment, and after the TCH setup is complete, the processor of MS 101 instructs the transmitter to transmit any inbound data to the RAN via the TCH. If a query was received before, the inbound data may be the information requested. The BTS of RAN 110 receives this inbound data and may continue to transmit and receive data to and from MS 101 via the TCH. In an alternative embodiment, outbound data is not transmitted via SDB until after the RAN transmits a page and receives a page response from the MS. In this alternative embodiment, then, the channel assignment and SDB are transmitted to the MS by the serving BTS. In fact, a single SDB may contain both channel assignment information and the outbound data.

Thus, the first embodiment of the present invention reduces wireless data transfer delay by sending data (e.g., a query) substantially concurrent with the paging of the dormant wireless unit. The RAN does not need to page, receive a page response, and then complete TCH setup before sending a query to the dormant user. Also, the TCH is not sitting idle after the initial query is sent. Today, the TCH is established before a query can be sent and thus is idled while a query response is generated or obtained. By parallelizing the paging and channel setup with the data querying, the idle TCH time is reduced if not eliminated, thereby improving channel utilization.

FIG. 2 is a logic flow diagram of steps executed by a radio access network in accordance with a first embodiment of the present invention. Logic flow 200 begins (201) when the RAN determines (202) that data, such as a data query, needs to be sent to a dormant wireless unit. The RAN also determines that the data is less than or equal to a maximum size (i.e., a pre-configured size). The RAN transmits (203) the data via an SDB, also indicating that the unit should respond with a page response and indicating that a channel assignment will be transmitted. After receiving (204) a page response from the unit, the RAN transmits (205) a TCH assignment. After the TCH setup is complete, the RAN receives (206) inbound data via the TCH that is in response to the data initially transmitted in the SDB. Logic flow 200 then ends (207).

FIG. 3 is a logic flow diagram of steps executed by a wireless unit in accordance with a first embodiment of the present invention. Logic flow 300 begins (301) when the wireless unit enters a dormant mode of a data session. While dormant, the unit receives (303) data via an SDB from the RAN. The SDB also indicates that a TCH assignment will be transmitted and that the wireless unit should respond with a page response. After transmitting (304) a page response, the unit receives a TCH assignment. Once the TCH setup is complete and data in response to that received via SDB is ready, the wireless unit transmits (306) it to the RAN via the TCH. Logic flow 300 then ends (307).

While the present invention has been particularly shown and described with reference to particular embodiments thereof, it will be understood by those skilled in the art that various changes in form and details may be made therein without departing from the spirit and scope of the present invention.

What is claimed is:

1. A method for wireless data transfer with reduced delay comprising:
   determining that outbound data needs to be wirelessly transferred to a wireless unit in a dormant mode of a data session;
   transmitting, via a broadcast channel, the outbound data and an indication that a channel assignment will be transmitted, wherein the outbound data is associated with a non-call-based, packet data service;
   receiving a page response from the wireless unit;
   transmitting to the wireless unit a channel assignment for a traffic channel; and receiving inbound data from the wireless unit via the traffic channel wherein transmitting the outbound data and the indication that a channel assignment will be transmitted comprises transmitting the outbound data and the indication that a channel assignment will be transmitted via one of a Short Data Burst (SDB) message and a Short Message Service (SMS) message.

2. The method of claim 1 wherein the outbound data comprises a data query.

3. The method of claim 2 wherein the inbound data is received in response to the data query transmitted via the broadcast channel.

4. The method of claim 1 further comprising transmitting via the SDB message an indication for the wireless unit to respond with a page response.

5. The method of claim 1 wherein transmitting the outbound data and the indication that a channel assignment will be transmitted comprises determining that the outbound data is less than or equal to a maximum size.

6. The method of claim 1 further comprising transmitting an indication for the wireless unit to enter an un-slotted mode and monitor for a page.

7. The method of claim 6 further comprising transmitting a page for the wireless unit.

8. A method for wireless data transfer with reduced delay comprising:
 entering a dormant mode of a data session;
 receiving, from a radio access network (RAN) via a broadcast channel, outbound data and an indication that a channel assignment will be transmitted, wherein the outbound data is associated with a non-call-based, packet data service;
 transmitting a page response to the RAN;
 receiving a channel assignment for a traffic channel; and
 transmitting inbound data to the RAN via the traffic channel, wherein receiving the outbound data and the indication that a channel assignment will be transmitted comprises receiving the outbound data and the indication that a channel assignment will be transmitted via one of a Short Data Burst (SDB) message and a Short Message Service (SMS) message.

9. The method of claim 8 wherein the outbound data comprises a data query.

10. The method of claim 9 wherein the inbound data is transmitted in response to the data query received via the broadcast channel.

11. The method of claim 8 further comprising receiving an indication to respond to the SDB message with a page response.

12. The method of claim 8 further comprising receiving an indication to enter an un-slotted mode and monitor for a page.

13. The method of claim 8 further comprising receiving a page from the RAN.

14. A method for wireless data transfer with reduced delay comprising:
 determining that outbound data needs to be wirelessly transferred to a wireless unit in a dormant mode of a data session;
 transmitting a page for the wireless unit;
 receiving a page response from the wireless unit;
 transmitting, via a Short Data Burst (SDB) message, the outbound data, wherein the outbound data is associated with a non-call-based, packet data service;
 transmitting to the wireless unit a channel assignment for a traffic channel; and
 receiving inbound data from the wireless unit via the traffic channel, wherein the channel assignment is transmitted via the SDB.

15. A wireless unit comprising:
 a transmitter;
 a receiver adapted to receive, from a radio access network (RAN) via a broadcast channel and via one of a Short Data Burst (SDB) message and a Short Message Service (SMS) message, outbound data and an indication that a channel assignment will be transmitted and adapted to receive a channel assignment for a traffic channel, wherein the outbound data is associated with a non-call-based, packet data service; and
 a processor, coupled to the transmitter and the receiver, adapted to enter a dormant mode of a data session, adapted to instruct the transmitter to transmit a page response to the RAN, and adapted to instruct the transmitter to transmit inbound data to the RAN via the traffic channel.

16. A radio access network (RAN) comprising:
 RAN network equipment adapted to determine that outbound data needs to be wirelessly transferred to a wireless unit in a dormant mode of a data session, wherein the outbound data is associated with a non-call-based, packet data service; and
 a base transceiver station, coupled to the RAN network equipment, adapted to transmit via a broadcast channel and via one of a Short Data Burst (SDB) message and a Short Message Service (SMS) message, the outbound data and an indication that a channel assignment will be transmitted, adapted to receive a page response from the wireless unit, adapted to transmit to the wireless unit a channel assignment for a traffic channel, and adapted to receive inbound data from the wireless unit via the traffic channel.

17. The RAN of claim 16 wherein the RAN network equipment comprises a base site controller (BSC) and a packet control function (POF).

18. The RAN of claim 16 wherein the broadcast channel comprises a paging channel.

\* \* \* \* \*